United States Patent
Wu

(10) Patent No.: US 9,612,454 B2
(45) Date of Patent: Apr. 4, 2017

(54) LENS AND METHOD FOR CORRECTING VISION OF A USER

(71) Applicant: HILINE OPTICAL CO., LTD., Taipei (TW)

(72) Inventor: Richard Wu, Taipei (TW)

(73) Assignee: BRIGHTEN OPTIX CORPORATION, Taipei (TW)

( * ) Notice: Subject to any disclaimer, the term of this patent is extended or adjusted under 35 U.S.C. 154(b) by 341 days.

(21) Appl. No.: 14/286,239

(22) Filed: May 23, 2014

(65) Prior Publication Data

US 2014/0347622 A1 Nov. 27, 2014

(30) Foreign Application Priority Data

May 24, 2013 (TW) .............................. 102118442 A

(51) Int. Cl.
  *G02C 7/04* (2006.01)
  *G02C 7/06* (2006.01)

(52) U.S. Cl.
  CPC .............. *G02C 7/044* (2013.01); *G02C 7/045* (2013.01); *G02C 2202/24* (2013.01)

(58) Field of Classification Search
  CPC .......... G02C 7/04; G02C 7/041; G02C 7/042; G02C 7/043; G02C 7/044; G02C 7/045; G02C 7/048
  USPC ............. 351/159.02, 159.13, 159.14, 159.43
  See application file for complete search history.

(56) References Cited

U.S. PATENT DOCUMENTS

| | | | | |
|---|---|---|---|---|
| 4,211,476 A | * | 7/1980 | Brummel | G02C 7/048 351/159.04 |
| 5,512,220 A | | 4/1996 | Roffman et al. | |
| 8,240,847 B2 | | 8/2012 | Holden et al. | |
| 8,672,472 B2 | | 3/2014 | Holden et al. | |
| 2009/0303442 A1 | * | 12/2009 | Choo | G02C 7/047 351/246 |
| 2011/0085129 A1 | * | 4/2011 | Legerton | G02C 7/04 351/159.16 |
| 2013/0293834 A1 | * | 11/2013 | Wang | G02C 7/044 351/159.41 |

FOREIGN PATENT DOCUMENTS

| | | |
|---|---|---|
| CN | 1070743 A | 4/1993 |
| CN | 101467092 A | 6/2009 |
| CN | 102262307 A | 11/2011 |
| CN | 102906631 A | 1/2013 |
| CN | 202748558 U | 2/2013 |

OTHER PUBLICATIONS

Search report issued in correspondence Chinese Patent Application No. 2013101993271, May 6, 2015, and corresponding English translation.

* cited by examiner

*Primary Examiner* — Scott J Sugarman
(74) *Attorney, Agent, or Firm* — Hamre, Schumann, Mueller & Larson, P.C.

(57) ABSTRACT

A lens for correcting vision of a user includes a central zone and an outer zone. The central zone is configured to cause light passing therethrough to form an image on a retina of an eye of the user. The outer zone surrounds the central zone and has a plurality of different aspherical coefficients for respectively causing light passing therethrough to form images spaced apart from the retina.

14 Claims, 5 Drawing Sheets

LENS AND METHOD FOR CORRECTING VISION OF A USER

CROSS-REFERENCE TO RELATED APPLICATION

This application claims priority to Taiwanese Application No. 102118442, filed on May 24, 2013.

BACKGROUND OF THE INVENTION

1. Field of the Invention

This invention relates to a lens, more particularly to a lens for correcting vision of a user.

2. Description of the Related Art

Referring to FIGS. 1 and 2, a conventional lens 1 for correcting vision of a user includes a central zone 11, and an outer zone 12 surrounding the central zone 11. The central zone 11 and the outer zone 12 have different curvatures. In a case of the user being myopic, the central zone 11 causes light passing therethrough to form a clear image on a retina 19 of an eye of the user, and the outer zone 12 causes light passing therethrough to form an image in front of the retina 19 at a point (Q), i.e., a blur or defocus image, which is slightly myopic to the user. It has been proven in many researches and studies that such design may slow down myopia aggravation of the user.

However, the outer zone 12 of the conventional lens 1 having a single curvature can only provide a defocus image in front of the retina 19 at a fixed position, which may not be suitable for various eyeball configurations of different users.

SUMMARY OF THE INVENTION

Therefore, the object of the present invention is to provide a lens capable of forming various images spaced apart from the retina of the user to arrest progression of myopia or hyperopia.

According to this invention, a lens for correcting vision of a user includes a central zone and an outer zone. The central zone is configured to cause light passing therethrough to form an image on a retina of an eye of the user. The outer zone surrounds the central zone and has a plurality of different aspherical coefficients for respectively causing light passing therethrough to form images spaced apart from the retina.

According to another object of this invention, there is provided a method for correcting vision of a user. The method comprises the following steps of: a) providing a first vision correcting device that has a first aspherical coefficient for causing light passing therethrough to form an image on a retina of an eye of the user; b) providing a plurality of second vision correcting devices, each of which has a second aspherical coefficient for causing light passing therethrough to form an image spaced apart from the retina, the second aspherical coefficients respectively of the second vision correcting devices being different from one another; and c) providing a lens that includes a central zone having the first aspherical coefficient, and an outer zone surrounding the central zone and having the second aspherical coefficients.

BRIEF DESCRIPTION OF THE DRAWINGS

Other features and advantages of the present invention will become apparent in the following detailed description of the preferred embodiments of the invention, with reference to the accompanying drawings, in which.

DETAILED DESCRIPTION OF THE PREFERRED EMBODIMENTS

Figure 1:
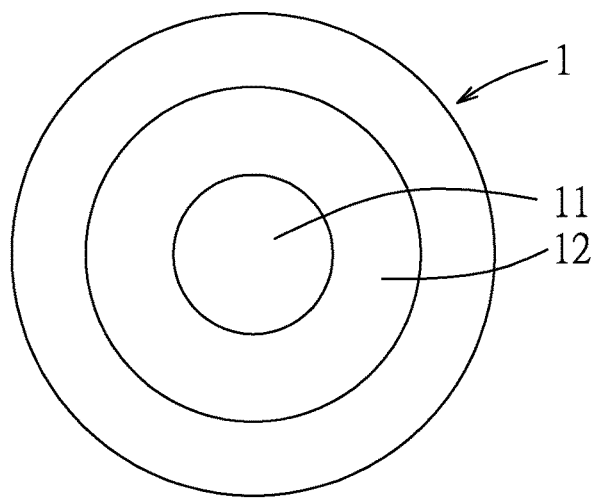
FIG. 1 is a schematic plan view of a conventional lens.
Figure 2:
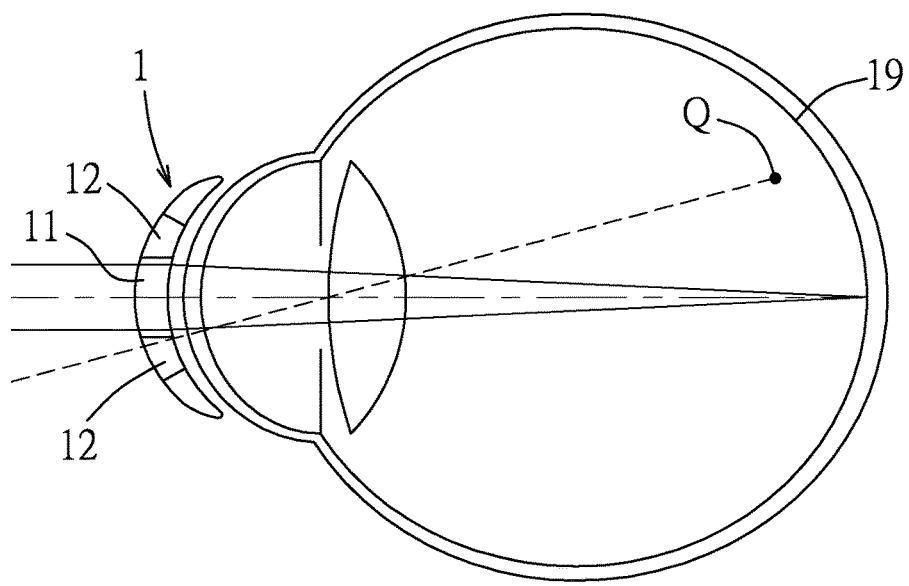
FIG. 2 is a schematic diagram illustrating optical path of light passing through the conventional lens.
Figure 3:
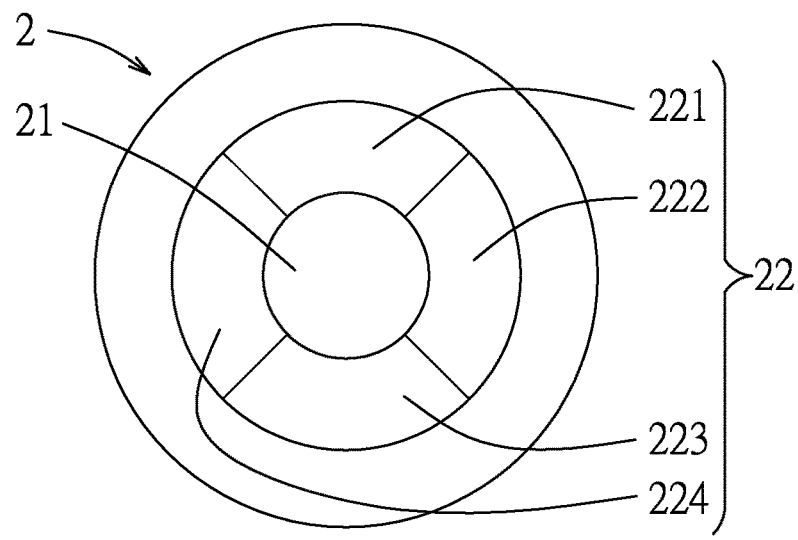
FIG. 3 is a schematic plan view of a first preferred embodiment of a lens according to the present invention.
Figure 4:
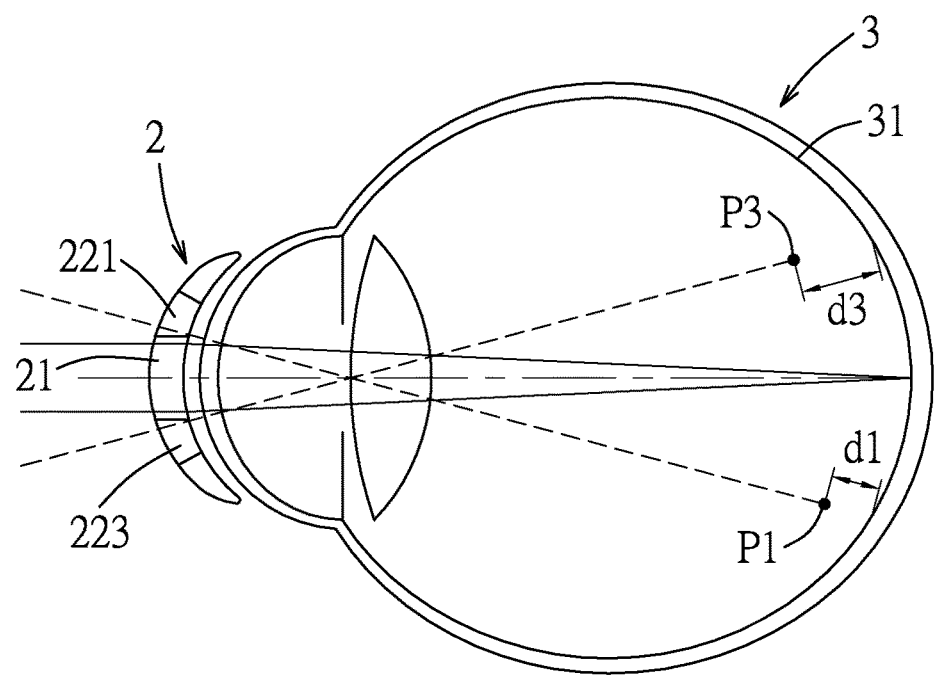
FIG. 4 is a schematic diagram illustrating optical path of light passing through the lens of the first preferred embodiment.

Referring to FIGS. 3 and 4, the first preferred embodiment of the lens 2 for correcting vision of a user according to the present invention includes a central zone 21 and an outer zone 22. The central zone 21 is configured to cause light passing therethrough to form an image on a retina 31 of an eye of the user. Note that the lens 2 may be configured for use in a pair of glasses, or may be configured as a contact lens.

The outer zone 22 surrounds the central zone 21, and has a plurality of different aspherical coefficients for respectively causing light passing therethrough to form images spaced apart from the retina 31. In this embodiment, the outer zone 22 includes a plurality of arc segments 221, 222, 223, 224 angularly connected to one another to surround the central zone 21. Connected two of the arc segments 221, 222, 223, 224 have respective different aspherical coefficients so as to cause light passing therethrough to form respective defocus images at different distances from the retina 31. Note that the number of the arc segments 221, 222, 223, 224 is not limited to what is disclosed herein and may be 360, i.e., one arc segment per degree.

In a case of the user having myopia without wearing the lens 2 of the present invention, light passes through a crystalline lens in an eye of the user and forms an image in front of the retina 31. After the user wears the lens 2, light passes through the central zone 21 and the crystalline lens to form a clear image on the retina 31. In this embodiment, the aspherical coefficient of each of the arc segments 221, 222, 223, 224 is made to be smaller than that of the central zone 21 so as to form images in front of the retina 31.

FIG. 4 illustrates one light beam passing through the arc segment 221 to form an image at a point (P1) that is spaced apart from the retina 31 by a first distance (d1). Similarly, another light beam passing through the arc segment 223 forms another image at another point (P3) that is spaced apart from the retina 331 by a second distance (d3) which is different from the first distance (d1). By this way, progression of myopia of the user may be arrested.

In this embodiment, the four arc segments 221, 222, 223, 224 have different aspherical coefficients but the invention is not limited in this respect. For example, in other embodiments of this invention, the arc segments 221, 223 may have the same aspherical coefficient, and the arc segments 223, 224 may have the same aspherical coefficient which is different from that of the arc segments 221, 223.

It may be appreciated that in a case of the user being hyperopia, the arc segments 221, 222, 223, 224 may be made to have aspherical coefficients larger than that of the central zone 21 and are configured to form the respective images behind the retina 31 to arrest progression of hyperopia.

Figure 5:
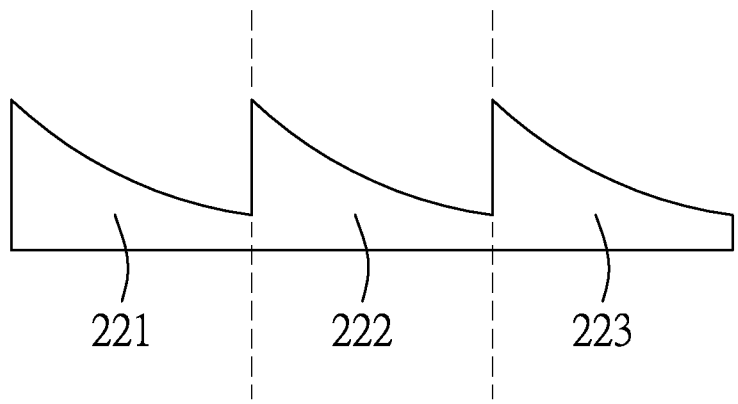
FIG. 5 is a schematic side view illustrating an example of an outer zone of the lens of the first preferred embodiment.
Figure 6:
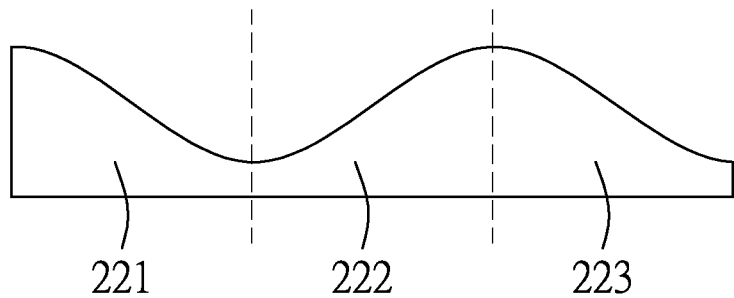
FIG. 6 is a schematic side view illustrating another example of the outer zone of the lens of the first preferred embodiment.

Additionally, as shown in FIGS. 5 and 6, when the lens 2 is configured as a contact lens, a junction between connected two of the arc segments 221, 222, 223, 224 can be configured to have a stepped-shape or a smooth shape depending on user requirement. Specifically, when the junction between connected two of the arc segments 221, 222, 223, 224 have a stepped-shape, rotation of the lens 2 may occur resulted in response to blinking of the eye of the user and the positions of images formed apart from the retina 3 are changed correspondingly. On the other hand, when the junction between connected two of the arc segments 221, 222, 223, 224 have a smooth shape, rotation of the lens 2 may be arrested. Note that it is possible to manufacture the lens 2 of the present invention that has an asymmetric configuration using a lathe apparatus and method disclosed in EP 0872307. Since the feature of the present invention does not reside in the specific construction of the lathe apparatus and procedures of the method for manufacturing the lens 2, further details of the same are omitted herein for the sake of brevity.

Figure 7:
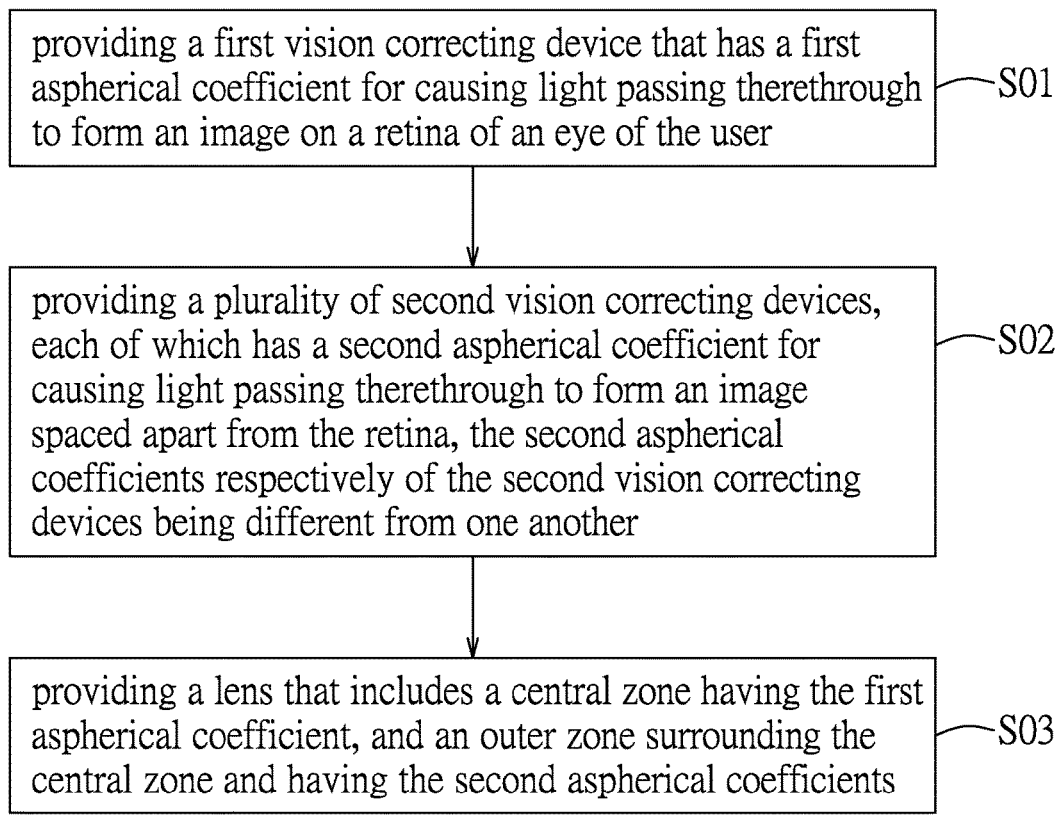
FIG. 7 is a flow chart of a method for correcting vision of the user according to the present invention.

Referring to FIG. 7, a method for correcting vision of a user is shown to include the following steps.

In step S01, a first vision correcting device is provided in front of an eye of the user. The first vision correcting device has a first aspherical coefficient for causing light passing therethrough to form an image on the retina 31 of the eye of the user.

In step S02, a plurality of second vision correcting devices are provided. Each of the second vision correcting devices has a second aspherical coefficient for causing light passing therethrough to form an image spaced apart from the retina 31, and the second aspherical coefficients respectively of the second vision correcting devices are different from one another. The second aspherical coefficient of each of the second vision correcting devices is smaller than the first aspherical coefficient of the first vision correcting device so as to form images in front of the retina 31. It may be appreciated that in a case of the user being hyperopia, the second aspherical coefficients are larger than the first aspherical coefficient to form the respective images behind the retina 31 to arrest progression of hyperopia.

In step S03, a lens 2 as shown in FIG. 3 is provided to include a central zone 21 having the first aspherical coefficient, and an outer zone 22 surrounding the central zone and having the second aspherical coefficients.

Figure 8:
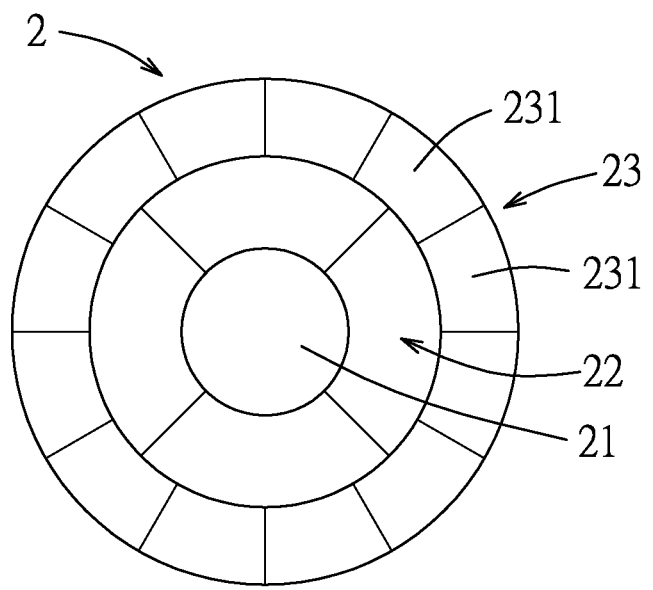
FIG. 8 is a schematic plan view of a second preferred embodiment of the lens according to the present invention.
Figure 9:
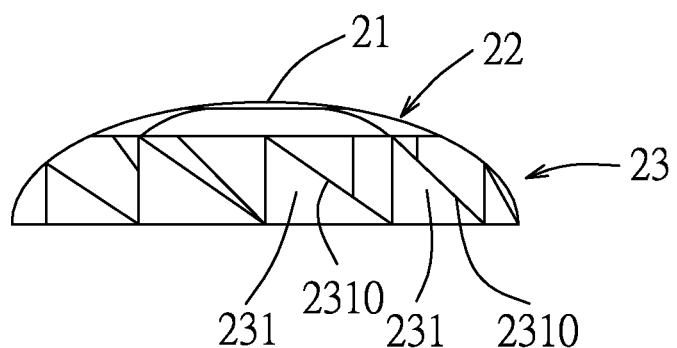
FIG. 9 is a schematic side view of the second preferred embodiment.

Referring to FIGS. 8 and 9, the second preferred embodiment of the lens 2 according to this invention is shown. In this embodiment, the lens 2 is configured as a contact lens and further includes a peripheral zone 23. The peripheral zone 23 surrounds the outer zone 22, and includes a plurality of prism segments 231 radially extending and angularly connected to one another to surround the outer zone 22. Each of the prism segments 231 has a thickness at an optical axis of the central zone 21 decreasing in a direction along arrangement of the prism segments 231 surrounding the outer zone 23. Each prism segment 231 further has a slanting surface 2310 for contacting the eye of the user, and the slanting surface 2310 has a gradient relative to the thickness of the prism segment 231. Such configuration results in rotation of the lens 2 in the direction in response to blinking of the eye of the user, and the positions of images formed apart from the retina 3 are changed correspondingly. Note that the gradient of the slanting surface 2310 of each of the prism segments 231 is in positive correlation with a rotation speed of the lens 2. By this way, the positions of images formed in front of or behind the retina 31 vary continuously as the user blinks. Consequently, progression of myopia or hyperopia of the user may be further suppressed.

To sum up, by virtue of the outer zone 22, light passing therethrough forms images on various positions spaced apart from the retina 31 of the user. Further, the configuration of the peripheral zone 23 results in rotation of the lens 2 to continuously change positions of the images formed apart from the retina 31 to thereby further improve potential of slowing down or stopping progression of myopia or hyperopia of the user.

While the present invention has been described in connection with what are considered the most practical and preferred embodiments, it is understood that this invention is not limited to the disclosed embodiments but is intended to cover various arrangements included within the spirit and scope of the broadest interpretations and equivalent arrangements.

What is claimed is:

1. A lens for correcting vision of a user, the lens comprising:
   a central zone configured to cause light passing therethrough to form an image on a retina of an eye of the user; and
   an outer zone surrounding the central zone and having a plurality of different aspherical coefficients for respectively causing light passing therethrough to form images spaced apart from the retina;
   wherein the outer zone includes a plurality of arc segments angularly connected to one another to surround the central zone, connected two of the arc segments having respective different aspherical coefficients so as to cause light passing therethrough to form respective images at different distances from the retina.

2. The lens as claimed in claim 1, wherein the arc segments are configured to form the respective images in front of the retina.

3. The lens as claimed in claim 1, wherein the arc segments are configured to form the respective images behind the retina.

4. The lens as claimed in claim 1, wherein a junction between connected two of the arc segments has a stepped-shape.

5. The lens as claimed in claim 1, wherein a junction between connected two of the arc segments is smooth.

6. The lens as claimed in claim 1, wherein the aspherical coefficient of each of the arc segments is smaller than that of the central zone.

7. The lens as claimed in claim 1, wherein the lens is configured to be used in a pair of glasses.

8. The lens as claimed in claim 1, wherein the lens is configured as a contact lens.

9. The lens as claimed in claim 8, further comprising a peripheral zone surrounding the outer zone, and including a plurality of prism segments radially extending and angularly connected to one another to surround the outer zone, each of the prism segments having a thickness at an optical axis of the central zone decreasing in a direction along arrangement of the prism segments surrounding the outer zone, such that the lens rotates in the direction in response to blinking of the eye of the user.

10. The lens as claimed in claim 9, wherein each of the prism segments has a slanting surface for contacting the eye of the user and having a gradient relative to the thickness of the prism segment and in positive correlation with a rotation speed of the lens.

11. A method for correcting vision of a user, the method comprising:
providing a first vision correcting device that has a first aspherical coefficient for causing light passing therethrough to form an image on a retina of an eye of the user;
providing a plurality of second vision correcting devices, each of which has a second aspherical coefficient for causing light passing therethrough to form an image spaced apart from the retina, the second aspherical coefficients respectively of the second vision correcting devices being different from one another, the second vision correcting devices causing light passing therethrough to form respective images at different distances from the retina; and
providing a lens that includes a central zone having the first aspherical coefficient, and an outer zone surrounding the central zone and having the second aspherical coefficients, wherein the outer zone of the lens includes a plurality of arc segments angularly connected to one another, connected two of the arc segments have respective different aspherical coefficients.

12. The method as claimed in claim 11, wherein the second vision correcting devices are provided to cause light passing therethrough to form the respective images in front of the retina.

13. The method as claimed in claim 11, wherein the second vision correcting devices are provided to cause light passing therethrough to form the respective images behind the retina.

14. The method as claimed in claim 11, wherein the lens is provided as a contact lens that rotates in response to blinking of the eye of the user.

* * * * *